United States Patent
Zimmer

(10) Patent No.: US 6,558,066 B1
(45) Date of Patent: May 6, 2003

(54) DEVICE FOR FIXING A PART ON A DRIVE SHAFT OF A WIPER SYSTEM

(75) Inventor: Joachim Zimmer, Sasbach (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/674,204

(22) PCT Filed: Nov. 6, 1999

(86) PCT No.: PCT/DE99/03556

§ 371 (c)(1),
(2), (4) Date: Oct. 27, 2000

(87) PCT Pub. No.: WO00/53469

PCT Pub. Date: Sep. 14, 2000

(30) Foreign Application Priority Data

Mar. 6, 1999 (DE) .......................... 199 09 970

(51) Int. Cl.[7] ................................................. B25G 3/20
(52) U.S. Cl. ............................... 403/374.4; 403/374.1; 403/373; 403/409.1
(58) Field of Search .................... 403/373, 374.2–374.4, 403/409.1, 367, 371

(56) References Cited

U.S. PATENT DOCUMENTS

| | | | | |
|---|---|---|---|---|
| 2,994,900 A | * | 8/1961 | Smithers | 15/250.34 |
| 3,085,821 A | | 4/1963 | Francis | |
| 3,429,597 A | | 2/1969 | Krohm | |
| 4,009,901 A | * | 3/1977 | Barbee | 15/250.16 |
| 4,144,614 A | * | 3/1979 | Barbee | 15/250.19 |
| 4,630,690 A | * | 12/1986 | Beasley et al. | 175/325.5 |
| 4,856,137 A | * | 8/1989 | Palu | 15/250.31 |
| 5,141,356 A | * | 8/1992 | Chaize | 254/29 A |
| 5,621,943 A | * | 4/1997 | Berge et al. | 15/250.34 |
| 5,699,582 A | * | 12/1997 | Berge et al. | 15/250.34 |

FOREIGN PATENT DOCUMENTS

| | | |
|---|---|---|
| DE | 44 28 371 A | 2/1996 |
| GB | 882 303 A | 11/1961 |

* cited by examiner

*Primary Examiner*—Lynne H. Browne
*Assistant Examiner*—Aaron Dunwoody
(74) *Attorney, Agent, or Firm*—Michael J. Striker

(57) ABSTRACT

An apparatus for securing a component (10) to a drive shaft (14, 52) of a wiper system (62), in which the drive shaft (14, 52) has at least one cross-sectional region (16) deviating from circular symmetry, has a pressure piece (18, 102), which is placed between the drive shaft (14, 52). The component (10), even before assembly has an opening (20) shaped to suit the cross-sectional region (16, 54) deviating from circular symmetry, and has an outer cone (22, 100), with which it is pressed, via a separable fastening element (24) on the drive shaft (14, 52), into a suitably shaped inner cone (26) of the component (10) and fixed jointly with the component (10) in the longitudinal direction of the shaft (28, 30). The cross-sectional region (16, 54), deviating from the circular symmetry, of the drive shaft (14, 52), at least in a region in the mounting direction (28), has an increasing diameter (32). The pressure piece (18, 102) is fixed nonpositively, without play, on the cross-sectional region (16, 54).

12 Claims, 6 Drawing Sheets

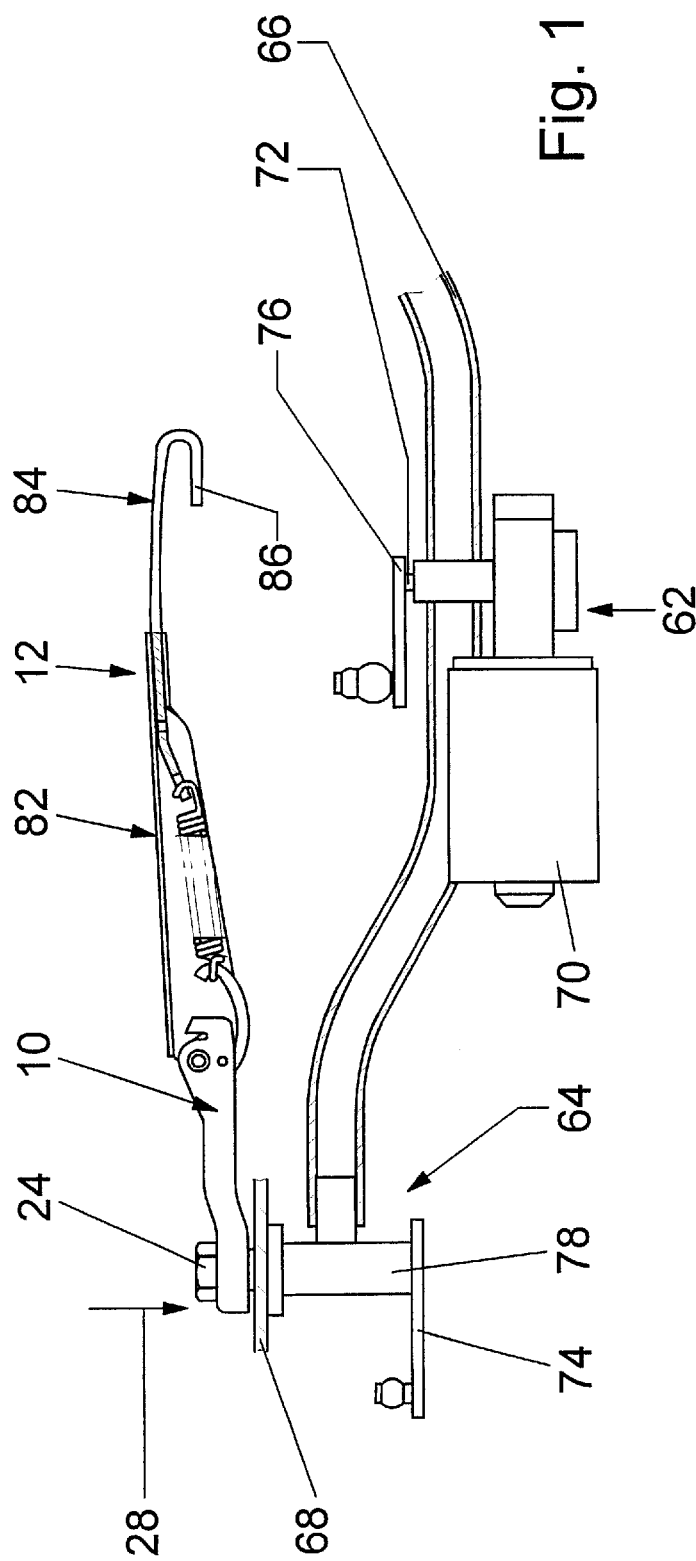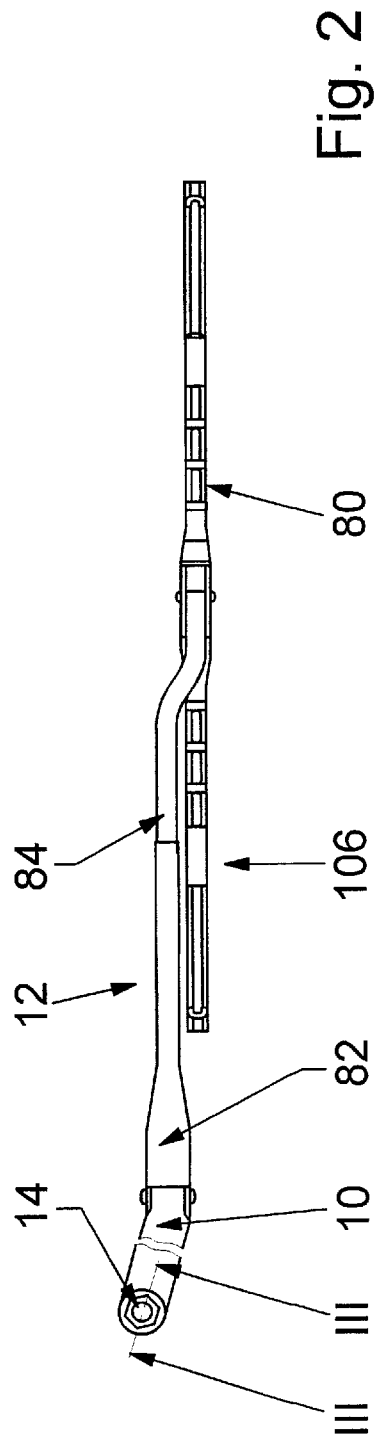

DEVICE FOR FIXING A PART ON A DRIVE SHAFT OF A WIPER SYSTEM

BACKGROUND OF THE INVENTION

The invention is based on an apparatus for securing a component to a drive shaft of a wiper system.

Wiper systems with a plurality of windshield wipers for motor vehicles are secured with their wiper bearings directly or indirectly via a mounting tube to the body of the motor vehicle. The mounting tube carries a wiper drive mechanism with a wiper motor, whose motor shaft, via a rod assembly, drives cranks that are solidly connected to one end of a drive shaft for each windshield wiper. It is also possible for only the drive shaft of one windshield wiper to be driven by the wiper motor, while another windshield wiper is connected to the first windshield wiper via a four-bar lever mechanism and has a bearing shaft. The drive shaft or a bearing shaft is supported in a wiper bearing. The remarks below pertain logically to a drive shaft for a bearing shaft as well, although it will no longer be expressly mentioned.

At least one radial bearing is provided in the bearing housing, and an axial bearing is provided between the bearing housing and a part solidly joined to the drive shaft. The drive shaft protrudes from the body and moves a wiper arm, secured to its free end, with a wiper blade over the windshield. The wiper arm has a fastening part, connected to the drive shaft in a manner fixed against relative rotation, that is pivotably connected to a hinge element, which is adjoined rigidly by a wiper rod. It is also possible for the wiper arm not to be directly connected to the drive shaft but instead to be driven via a lever mechanism with a drive lever connected to the drive shaft in a manner fixed against relative rotation. The remarks below on connecting the fastening part to the drive shaft also apply to a drive lever, which will no longer be expressly mentioned.

In known windshield wipers, the end of the shaft has an outer cone, onto which the fastening part is pressed with a fitting inner cone and firmly clamped by means of a nut. With this type of connection, production-dictated variations can unfavorably add up, so that accurate positioning of the fastening part relative to the drive shaft can be assured only with difficulty. Furthermore, the tightening moment of the nut affects the position of the wiper arm.

From German Patent Disclosure DE 44 28 371 A1, a shaft hub connection of a wiper is known, in which the drive shaft has a cross-sectional region that deviates from circular symmetry and also has a bearing shoulder. Placed between the drive shaft and the fastening part is a pressure piece, which has an opening that even before assembly is embodied to suit the cross-sectional region deviating from circular symmetry and which positively surrounds the drive shaft. The pressure piece also has an outer cone, with which it is pressed via a separable fastening element on the drive shaft into a suitably shaped inner cone of the fastening part. The fastening part is pressed onto the bearing shoulder by the fastening element via the pressure piece and fixed in the longitudinal direction of the shaft.

In the proposed embodiment, production variations have only slight influence on the precision of positioning of the wiper arm. The wiper arm can be secured with a high tightening moment, without influencing the positioning precision of the wiper arm.

From U.S. Pat. No. 3,085,821, a shaft hub connection is known in which a fastening part has an inner cone with a knurled or zigzag surface. The drive shaft also has a cylindrical or conical region with a knurled or zigzag surface. Upon installation, via a nut, a deformable pressure piece is pressed with an outer cone between the fastening part and the drive shaft. As a result of the conical connection between the fastening part and the pressure piece and optionally the conical connection between the pressure piece and the drive shaft, the zigzag surface of the fastening part and of the drive shaft is pressed into what until then are largely smooth surfaces of the pressure piece and permanently deform them. Along with a nonpositive engagement, many small side faces of the zigzags create a reinforcing positive engagement.

The fastening part transmits the drive moment from the drive shaft to the wiper blade, via the hinge element and the wiper system. It also forms part of the toggle joint by way of which the fastening part is tensed together with the hinge element with a tension spring and pressed in the direction of the vehicle window. The greatest forces or moments arise in the fastening part parallel and perpendicular to the vehicle window. Deformation and play in the lower region of the windsheild wiper also have an especially pronounced effect over the entire length and because of a spring effect can lead to uneven wiping speeds. The drive shaft and the fastening part should therefore be permanently joined without play. Furthermore, the wiper arm should be easy to install and disassemble together with the fastening part and the pressure piece.

SUMMARY OF THE INVENTION

The apparatus according to the invention has a drive shaft with a cross-sectional region deviating from circular symmetry, on which region a pressure piece is supported positively with an opening that even before assembly is embodied to suit the cross-sectional region deviating from circular symmetry. The cross-sectional region deviating from circular symmetry of the drive shaft, at least in one region, has an increasing diameter in the mounting direction or is embodied conically, as a result of which the pressure piece, in addition to a positive engagement that transmits the drive moment, is connected nonpositively and without play to the drive shaft. Furthermore when the pressure piece is slipped on, a greater inside diameter of the pressure piece initially meets a smaller outside diameter of the drive shaft, as a result of which the pressure piece canteasily be installed.

The pressure piece can be made from hard material, which maintains its shape during operation and can be secured permanently without play plastic deformation for the positive engagement is avoided, and the pressure piece can be used more than once. The opening of the pressure piece can be embodied with a constant diameter or advantageously with a diameter that corresponds to the drive shaft, that is, a diameter that increases in the mounting direction. Pressure pieces produced by an injection molding process, if they have a conical opening, are easy to release from a casting mold, especially pressure pieces of aluminum and an aluminum alloy. The bearing faces require little if any remachining, and the casting mold is not tattered as much in the unmolding process. The service lives are longer, and production costs drop.

The positive engagement between the drive shaft and the pressure piece is advantageously created with a few large, load-bearing faces, preferably from one to twelve faces. The pressure piece, with a suitably shaped opening given slight elastic deformation and tensing, can be made to rest on the faces without play, with a largely constant pressure per unit of surface area, as a result of the conical connection. Despite a play-free support of the pressure piece on the drive shaft, the pressure piece and a fastening part can be pulled off the drive shaft axially, or disassembled in the axial direction, using only slight force. Furthermore, a few load-bearing faces in the pressure piece and on the drive shaft can be manufactured inexpensively with low tolerances. The drive shaft can be embodied with a polygonal or nonround, for instance arbitrarily elliptical outer cone, and the pressure piece can be embodied with an inner cone to suit. Two-, four- or six-sided cross-sectional faces can be achieved easily by milling. However, it is more economical to provide a nonround or elliptical outer cone that is produced simultaneously in turning the drive shaft on a lathe. This reduces the production cost and retooling times.

On the cross-sectional region deviating from circular symmetry, the fastening part can also be braced directly by the increasing diameter on a bearing shoulder and/or advantageously in the mounting direction on a disk pressed onto the drive shaft. With a disk, the diameter of the drive shaft can be made smaller, making the drive shaft more economical. The disk can be advantageously joined nonpositively to the drive shaft by the increasing diameter of the cross-sectional region deviating from circular symmetry. The windshield wiper system having the drive shafts and the wiper arm with the wiper blade are as a rule furnished separately to an auto manufacturer. Because of the nonpositive connection between the disk and the drive shaft, the disk is advantageously joined in captive fashion to the windshield wiper system. In order to increase plastic deformation and the nonpositive engagement between the disk and the drive shaft, it is proposed in one feature that the cross-sectional region deviating from circular symmetry has a chamfer, onto which the disk is nonpositively pressed.

Along with the nonpositive connection, the disk is furthermore advantageously braced on a bearing shoulder. As a result, the disk can be mounted quickly at an exact point on the drive shaft. The pressure piece and the fastening part can be braced on the bearing shoulder via the disk. The nonpositive engagement between the disk and the drive shaft need be selected as only great enough that the disk is secured in captive fashion during shipping. However, it is fundamentally possible for the pressure piece and the fastening part to be braced on a solely nonpositively secured disk.

So that the wiper arm, from a certain parking position, wipes a defined angle over a windshield, and the initial position of the drive shaft is not precisely determinable, the wiper arm with the fastening part should be capable of being mounted, rotated infinitely variably, on the drive shaft. This is attained with a primarily nonpositive connection between the pressure piece and the fastening part, which can be mounted in a way rotated infinitely variably relative to one another. In order to attain not only a nonpositive but also a reinforcing positive engagement between the pressure piece and the fastening part, it is proposed that the inner cone of the component and/or the outer cone of the pressure piece be embodied in knurled fashion. In a further feature, it is proposed that the pressure piece be made from a softer material, in particular aluminum, an aluminum alloy, zinc, plastic, and so forth. The knurling on the inner cone of the fastening part digs deeper into the surface of the pressure piece, and the positive engagement is improved. Furthermore, aluminum is lightweight and does not flow; flowing could cause the transmissible torque to drop below the torque of the drive shaft, making this slide through with the pressure piece in the fastening part. Instead of making the pressure piece entirely of a softer material, the outer cone of the pressure piece or the inner cone of the component can be coated with a softer material, for instance with aluminum, plastic, and so forth. The torque can be transmitted from the drive shaft positively to the pressure piece between hard materials, and as a result-the fastening part and the pressure piece can be easily disassembled from the drive shaft. Also with a soft layer of material on the outer cone of the pressure piece or on the inner cone of the fastening part, a nonpositive engagement between the pressure piece and the fastening part can advantageously be reinforced by a good positive engagement.

The pressure per unit of surface area between the fastening part and the pressure piece can be increased not only by a softer material but also by certain contours, thus improving the positive engagement, preferably by means of an outer cone of the pressure piece or an inner cone of the fastening part that is embodied in graduated form in the longitudinal direction of the shaft. With a graduated outer cone of the pressure piece, the pressure piece can furthermore be removed more easily from a mold. With a knurled surface, a softer pressure piece, and/or a higher pressure per unit of surface area, production variations of the outer cone of the pressure piece and of the inner cone of the fastening part can also be compensated for better, and the pressure piece and the fastening part can be joined with a secure hold, without play.

In the arrangement according to the invention, the inner cone of the fastening part has a diameter that decreases in the mounting direction. In one feature it is proposed that the component be embodied as a sheet-metal part. The sheet-metal part can advantageously be made from one side in one or more deep-drawing operations, specifically in the mounting direction from the top side. Furthermore, the torque is transmitted from the drive shaft to the pressure piece over a small diameter via a positive engagement, and onto the fastening part over a large diameter via a nonpositive and a positive engagement. As the diameter increases, the effective lever arm of a reaction force and thus the shear force acting between the components decrease. The torque can be securely transmitted with a nonpositive engagement with a lesser pressure per unit of surface area in the case of a larger diameter, and as a result, a sheet-metal part can especially advantageously be used as the fastening part. With a fastening part embodied as a sheet-metal part, economies of weight, production effort and expense can be achieved.

BRIEF DESCRIPTION OF THE DRAWINGS

Further advantages will become apparent from the ensuing drawing description. In the drawing, exemplary embodiments of the invention are shown. The drawing, description and claims contain numerous characteristics in combination. One skilled in the art will expediently consider the characteristics individually as well and put them together to make appropriate further combinations.

Shown are:

FIG. 1, a detail of a wiper system with a wiper arm;

FIG. 2, a wiper arm with a wiper blade, seen from above;

DETAILED DESCRIPTION OF THE PREFERRED EMBODIMENTS

Figure 3:
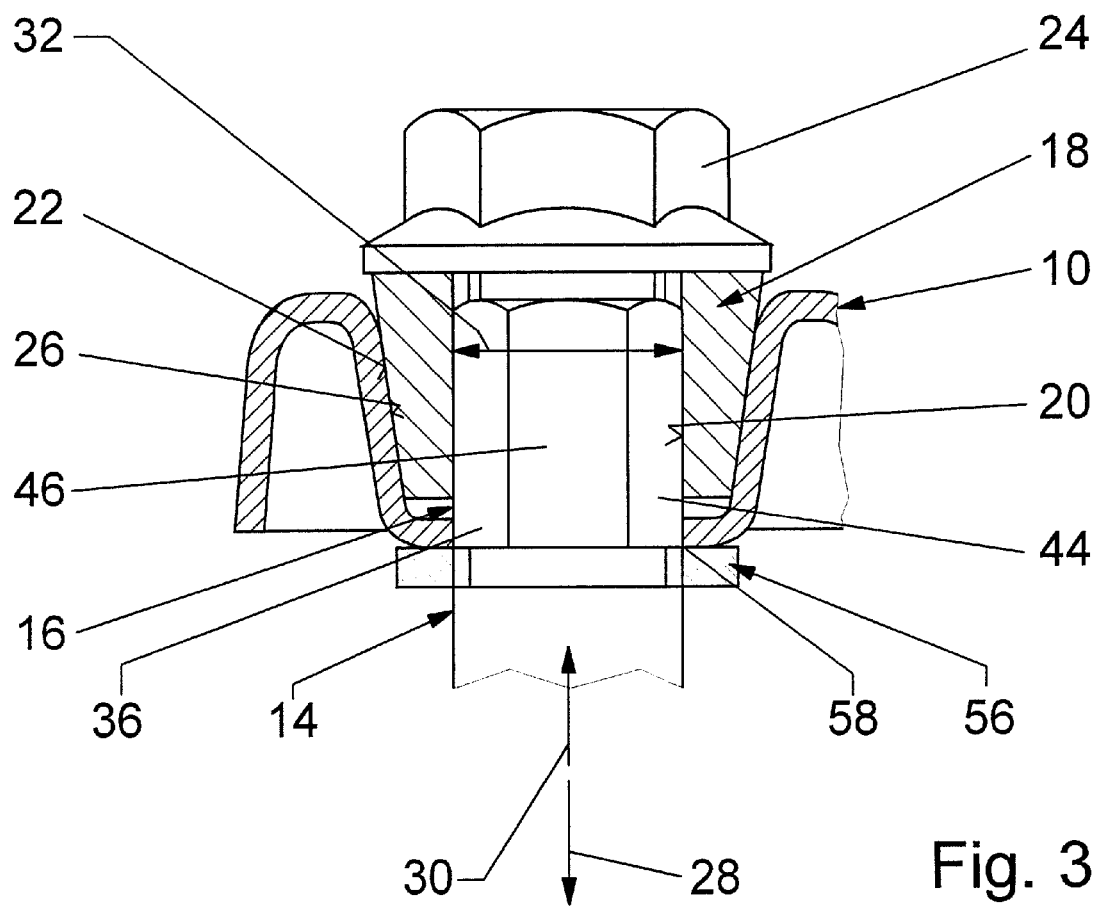
FIG. 3, an enlarged detail of a section taken along the line III—III in FIG. 2.

FIG. 1 shows a detail of a wiper system 62 for a motor vehicle, whose wiper bearings 64 are secured to the body 68 of the motor vehicle via a mounting tube 66. The mounting tube 66 carries a wiper drive mechanism with a wiper motor 70, whose motor shaft 72, via a crank 76 and a rod assembly, not identified by reference numeral, drives cranks 74, each of which is solidly connected to one end of a drive shaft 14 for a windshield wiper 106. The drive shaft is supported radially and axially in the wiper bearing 78, protrudes from the body 68, and moves a wiper arm 12, secured to its free end and having a wiper blade 80, over a windshield (FIG. 2). The wiper arm 12 has a fastening part 10, connected to the drive shaft 14, that is pivotably connected to a hinge element 82, which is rigidly adjoined by a wiper rod 84. The wiper blade 80 is suspended from a bracketlike end 86 of the wiper rod 84.

Figure 4:
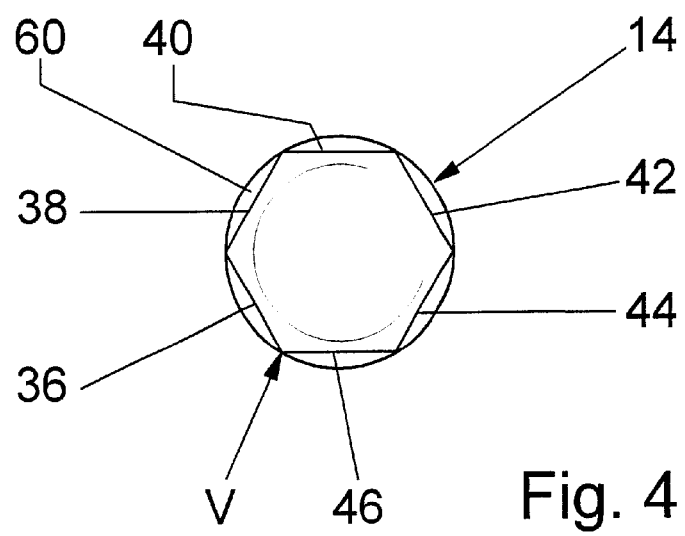
FIG. 4, a drive shaft seen from above.
Figure 5:
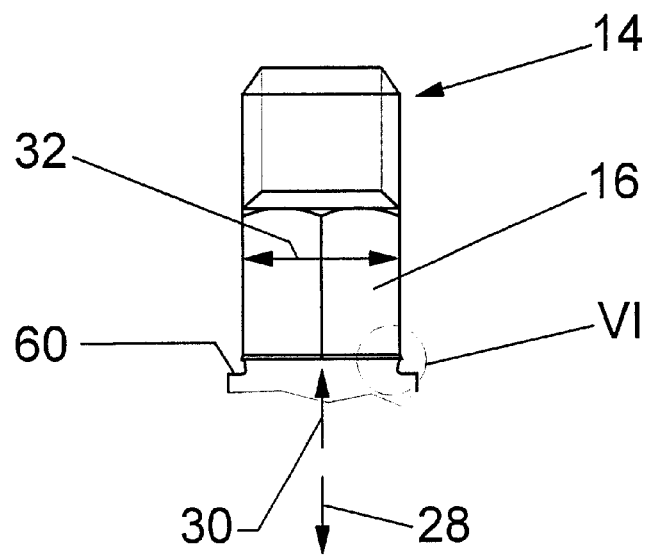
FIG. 5, a detail seen from the direction V in FIG. 4.
Figure 6:
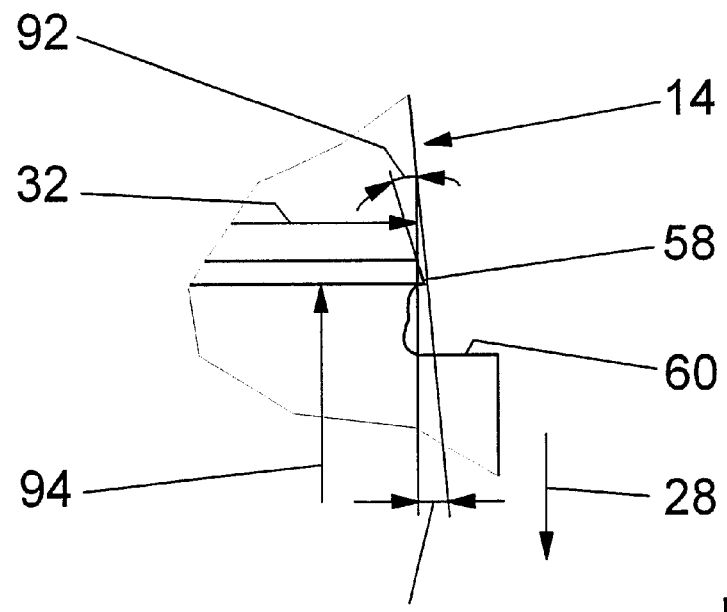
FIG. 6, an enlarged detail VI in FIG. 5.
Figure 11:
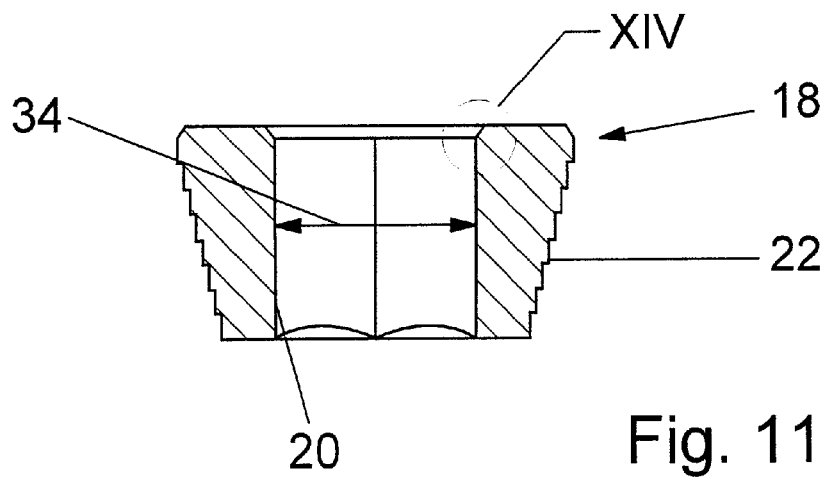
FIG. 11, a pressure piece in section.
Figure 13:
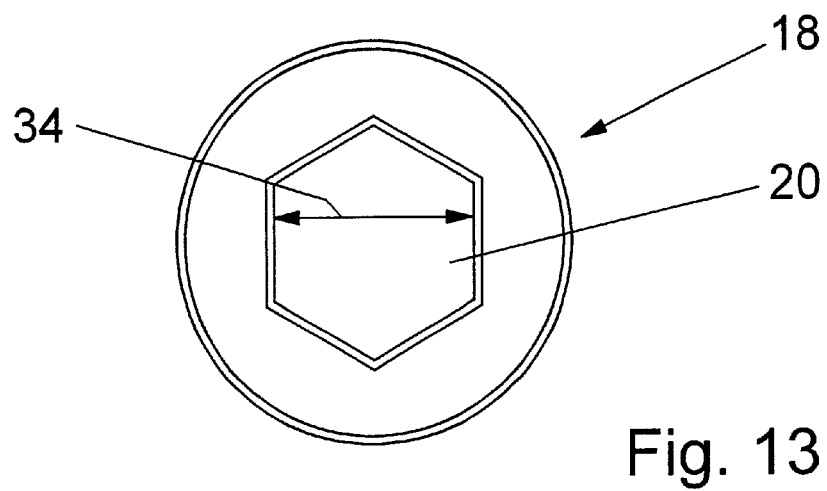
FIG. 13, a pressure piece seen from above.
Figure 14:
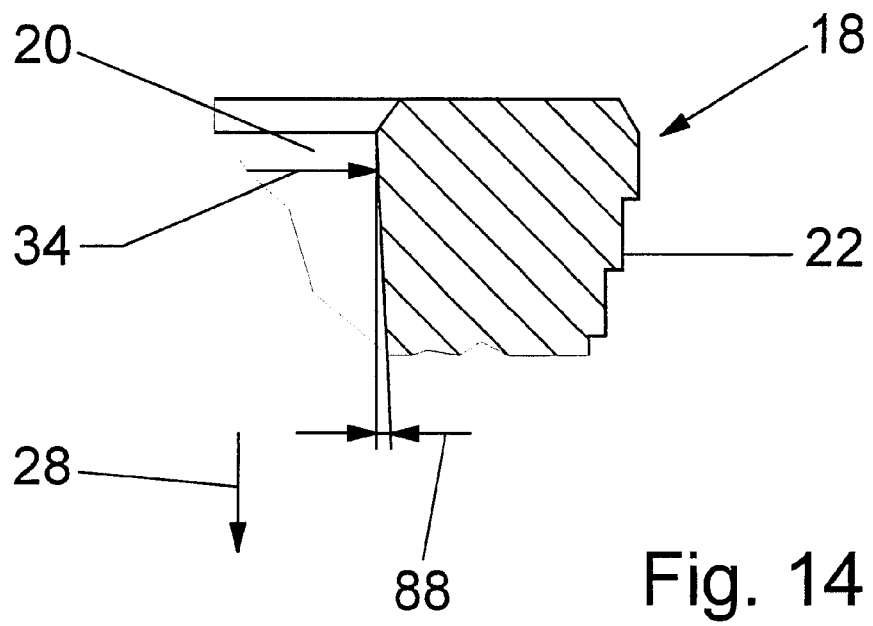
FIG. 14, an enlarged detail XIV in FIG. 11.

The drive shaft 14 has a cross-sectional region 16 deviating from circular symmetry, specifically a hexagon (FIGS. 3 and 4). A pressure piece 18 is placed between the fastening part 10 and the drive shaft 14; it has an opening 20 (FIG. 13) that even before assembly is embodied to suit the cross-sectional region 16 deviating from circular symmetry, and it surrounds the drive shaft 14 by positive engagement. The pressure piece 18 has an outer cone 22, with which, via a nut 24 on the drive shaft 14, it presses into a suitably shaped inner cone 26 of the fastening part 10 and is braced jointly with the fastening part 10 in the mounting direction 28 via a disk 56 on a bearing shoulder 60 (FIGS. 4, 5 and 6) and fixed in the longitudinal direction 28, 30 of the shaft. According to the invention, the cross-sectional region 16 of the drive shaft 14 that deviates from circular symmetry has a diameter 32 that increases in the mounting direction 28, or in other words is embodied conically, specifically with an angle 88 of approximately 1 to 2° (FIG. 6). The opening 20 has a diameter 34 corresponding to the cross-sectional region 16, or in other words is embodied conically, specifically again with an angle 88 of about 1 to 2° (FIGS. 11 and 14).

Figure 8:
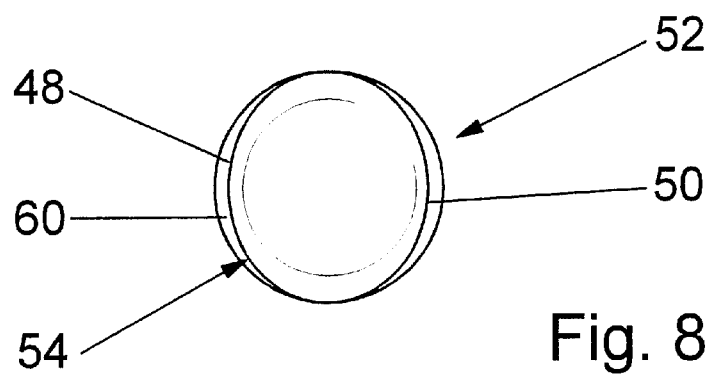
FIG. 8, a variant of FIG. 4.

The positive engagement, transmitting the torque, between the drive shaft 14 and the pressure piece 18 is created with only a few large, load-bearing faces 36, 38, 40, 42, 44, 46 of the hexagon (FIG. 4). Given a slight elastic deformation and tensing, the pressure piece 18 can be made to rest without play on the faces 36, 38, 40, 42, 44, 46 by the conical connection, with a largely uniform pressure per unit of surface area. The pressure piece 18 is supported without play on the drive shaft 14 and can furthermore jointly with the fastening part 10 easily be pulled off the drive shaft 14 in the axial direction 30. Instead of a hexagon, a drive shaft 52 with an elliptical cross-sectional region 54 can also be embodied, as shown in FIG. 8, which with two load-bearing faces 48, 50 can be positively joined to a suitably shaped pressure piece.

Figure 7:
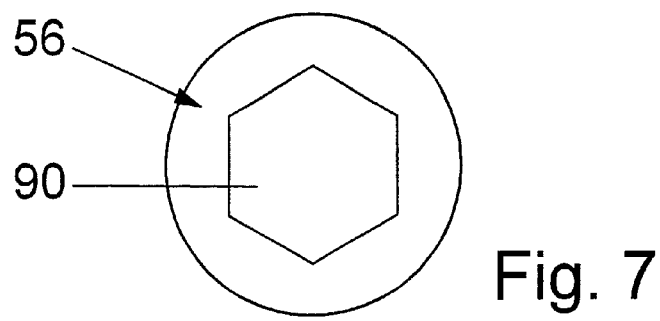
FIG. 7, a disk from above.

The disk 56 has an opening 90 (FIG. 7) shaped to suit the hexagon. To secure the disk 56 in captive fashion on the drive shaft 14, the cross-sectional region 16 has a chamfer 58, onto which the disk 56 is pressed by positive engagement (FIGS. 3 and 6). The chamfer 58 advantageously extends over a shaft length 94 of approximately 0.5 mm and has an angle 92 of approximately 20°. It would also be possible to secure the disk 56 in captive fashion on the conical cross-sectional region 16 solely by nonpositive engagement.

Figure 9:
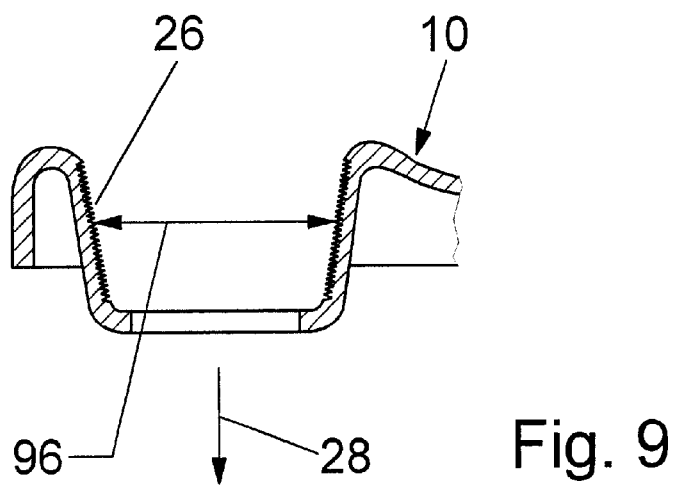
FIG. 9, a detail of a fastening part in section.
Figure 10:
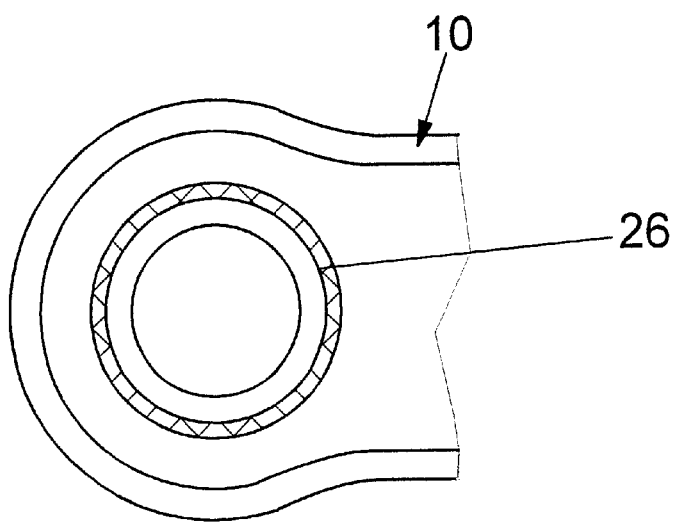
FIG. 10, a detail of a fastening part, seen from above.

In order to obtain not only a nonpositive engagement by also a reinforcing positive engagement between the pressure piece 18 and the fastening part 10, the inner cone 26 of the fastening part 10 is knurled (FIGS. 9 and 10). In the arrangement according to the invention, the fastening part 10 is advantageously embodied as a deep-drawn sheet-metal part. The inner cone 26 has a decreasing diameter 96 in the mounting direction 28, as a result of which the fastening part 10 can be produced economically from one side in one or more deep drawing operations, specifically in the mounting direction 28 from the top side. With a fastening part 10 embodied as a sheet-metal part, economies of weight, material, production effort, and cost can be achieved.

Figure 12:
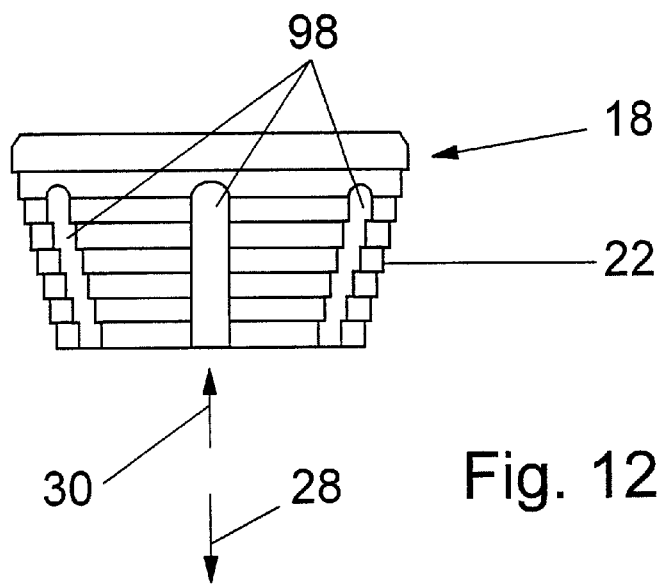
FIG. 12, a pressure piece seen from the side.
Figure 15:
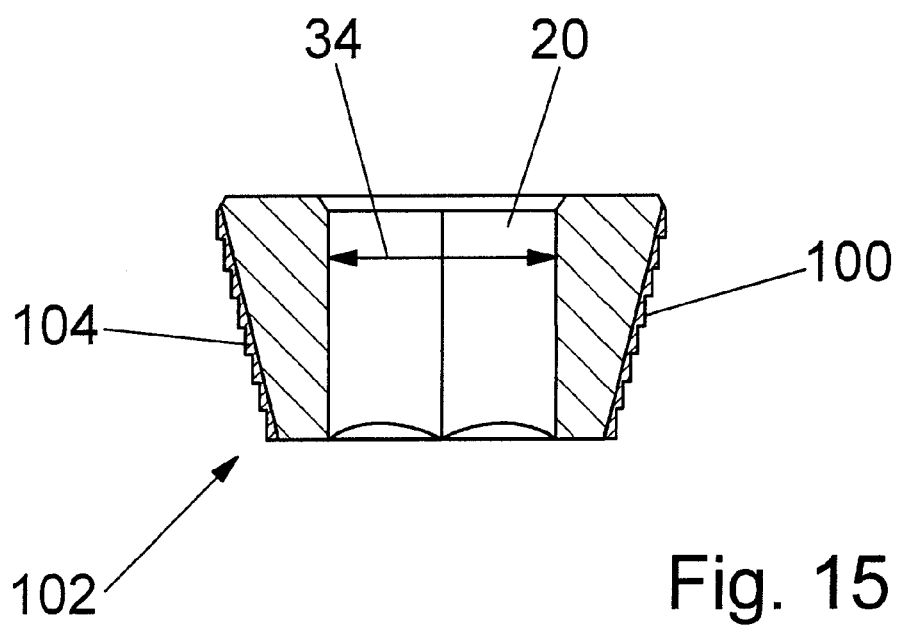
FIG. 15, a variant of FIG. 11.

The pressure piece 18 is made of aluminum. The knurling on the inner cone 26 of the fastening part 10 can be pressed deeply into the surface of the pressure piece 18 and as a result a good positive engagement can be attained. The positive engagement is also reinforced (FIGS. 11 and 12) with an outer cone 22 of the pressure piece 18 that is embodied in graduated form in the longitudinal direction 28, 30 and with indentations 98 distributed over the circumference and extending in the longitudinal direction 28, 30. The pressure per unit of surface area is increased, and the engagement of the knurling and the compensation of tolerances are improved. In FIG. 15, a pressure piece 102 is shown, in which only its outer cone 100 is coated with a softer material 104, specifically aluminum.

List of Reference Numerals

10 Fastening part
12 Wiper arm
14 Drive shaft
16 Cross-sectional region
18 Pressure piece
20 Opening
22 Outer cone
24 Fastening element
26 Inner cone
28 Mounting direction
30 Longitudinal direction of the shaft
32 Diameter
34 Diameter
36 Face
38 Face
40 Face
42 Face
44 Face
46 Face
48 Face
50 Face
52 Drive shaft
54 Cross-sectional region
56 Disk
58 Chamfer
60 Bearing shoulder
62 Wiper system
64 Wiper bearing
66 Mounting tube
68 Vehicle body
70 Wiper motor 72 Motor shaft
74 Crank
76 Crank
78 Wiper bearing
80 Wiper blade
82 Hinge element
84 Wiper rod
86 End
88 Angle
90 Opening
92 Angle
94 shaft length
96 Diameter
98 Indentations
100 Outer cone
102 Pressure piece
104 Material
106 Windshield wiper

What is claimed is:

1. An apparatus for securing a component (10) to a drive shaft (14, 52) of a wiper system (62), in which the drive shaft (14, 52) has at least one cross-sectional region (16) deviating from circular symmetry, and having a pressure piece (18, 102), which is placed between the drive shaft (14, 52) and the component (10) has an opening (20) shaped to suit the cross-sectional region (16, 54) deviating from circular symmetry, and has an outer cone (22, 100), with which it is pressed, via a separable fastening element (24) on the drive shaft (14, 52), into a suitably shaped inner cone (26) of the component (10) and fixed jointly with the component (10) in the longitudinal direction (28, 30) of the shaft, characterized in that the cross-sectional region (16, 54), deviating from the circular symmetry, of the drive shaft (14, 52), at least in a region in the mounting direction (28), has an increasing diameter (32), and the pressure piece (18, 102) is fixed nonpositively, without play, on the cross-sectional region (16, 54), wherein the outer cone (100) of the pressure piece (102) or the inner cone of the component (10) is coated with a softer material (104).

2. The apparatus of claim 1, characterized in that the opening (20) of the pressure piece (18, 102) has a diameter (34) corresponding to the cross-sectional region (16, 54).

3. The apparatus of claim 1, characterized in that the pressure piece (18, 102) and the drive shaft (14, 52) are positively joined via from one to twelve large load-bearing faces (36, 38, 40, 42, 44, 46, 48, 50).

4. The apparatus of claim 3, characterized in that the cross-sectional region (16) deviating from circular symmetry is embodied as a bilateral, quadrilateral, or hexagon.

5. The apparatus of claim 1, characterized in that the cross-sectional region (54) deviating from circular symmetry is embodied in elliptical shape.

6. The apparatus of claim 1, characterized in that the component (10) is braced in the mounting direction (28) on a disk (56) pressed on the drive shaft (14, 52).

7. The apparatus of claim 6, characterized in that the cross-sectional region (16, 54) deviating from circular symmetry has a chamfer (58), onto which the disk (56) is nonpositively pressed.

8. The apparatus of claim 6, characterized in that the disk (56) is braced in the mounting direction (28) on a bearing shoulder (60).

9. The apparatus of claim 1, characterized in that the inner cone (26) of the component (10) or the outer cone of the pressure piece (18, 102) is knurled.

10. The apparatus of claim 9, characterized in that the pressure piece (18) is of aluminum or an aluminum alloy.

11. The apparatus of claim 1, characterized in that the outer cone (22, 100) of the pressure piece (18, 102), or the inner cone of the component (10), is embodied in graduated fashion in the longitudinal direction (28, 30) of the shaft.

12. The apparatus of claim 1, in that the component (10) is a sheetmetal part.

* * * * *